US007213157B2

(12) United States Patent
Dariel

(10) Patent No.: US 7,213,157 B2
(45) Date of Patent: *May 1, 2007

(54) INTEGRATED CIRCUIT FOR DIGITAL RIGHTS MANAGEMENT

(75) Inventor: Dani Dariel, Omer (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/325,314

(22) Filed: Jan. 5, 2006

(65) Prior Publication Data

US 2006/0112282 A1    May 25, 2006

Related U.S. Application Data

(63) Continuation of application No. 10/634,872, filed on Aug. 6, 2003, now Pat. No. 7,058,818.

(60) Provisional application No. 60/401,753, filed on Aug. 8, 2002.

(51) Int. Cl.
*H04L 9/32* (2006.01)
(52) U.S. Cl. ...................... 713/189; 713/193
(58) Field of Classification Search ................ 713/189, 713/193–194; 705/51, 57–59; 380/200; 726/26
See application file for complete search history.

(56) References Cited

U.S. PATENT DOCUMENTS

| 4,914,697 | A |  | 4/1990 | Dabbish et al. |
| 5,267,312 | A |  | 11/1993 | Thompson et al. |
| 5,825,879 | A |  | 10/1998 | Davis |
| 5,960,084 | A | * | 9/1999 | Angelo ........................ 713/185 |
| 6,185,737 | B1 |  | 2/2001 | Northcutt et al. |
| 6,212,097 | B1 |  | 4/2001 | Kihara et al. |
| 6,408,390 | B1 | * | 6/2002 | Saito ............................ 713/193 |
| 6,598,164 | B1 | * | 7/2003 | Shepard ....................... 713/189 |
| 6,636,773 | B1 |  | 10/2003 | Tagawa et al. |
| 6,789,146 | B1 |  | 9/2004 | Dlugosch |
| 2002/0070272 | A1 |  | 6/2002 | Gressel et al. |

OTHER PUBLICATIONS

New Security Issues Raised By Open Cards—Girard et al, (Gemplus R & D, Cedex France 13881) Information security Technical Report, vol. 4, pp. 19-27 Elsevier May 1999.
Physical Security Devices for Computer Subsytems: A Survey of Attacks and Defenses—Steve H. Weingart Secure Systems and Smart Card Group IBM Thomas J Watson Research Center, Hawthorne NY weingart@us.ibm.com.

* cited by examiner

*Primary Examiner*—Hosuk Song
(74) *Attorney, Agent, or Firm*—Mark M. Friedman

(57) ABSTRACT

An ASIC for implementing digital rights management includes a processor for requesting encrypted digital data from a server and decrypting the data, and a player for transforming the decrypted data to analog signals. Preferably, the ASIC is tamper-resistant. Preferably, all the management code of the ASIC is stored on a ROM in the ASIC. A device for receiving, decrypting and displaying encrypted digital data includes the ASIC, and also a transceiver for communicating with the server, a display mechanism for displaying the analog signals, and a nonvolatile memory for storing the encrypted data. A system for storing and displaying digital data includes both the server and the device. Preferably, the server is configured to send to the device only the encrypted digital data and associated decryption keys.

46 Claims, 2 Drawing Sheets

INTEGRATED CIRCUIT FOR DIGITAL RIGHTS MANAGEMENT

This is a Continuation of U.S. patent application Ser. No. 10/634,872 filed Aug. 6, 2003, now U.S. Pat. No. 7,058,818 which is a Continuation-In-Part of U.S. Provisional Application No. 60/401,753, filed Aug. 8, 2002

FIELD AND BACKGROUND OF THE INVENTION

The present invention relates to application-specific integrated circuits (ASICs) and, more particularly, to an ASIC that facilitates digital rights management for copyrighted material.

The term "digital rights management" (DRM) encompasses, generally, the secure distribution, promotion and sale of proprietary data such as, but not limited to, audio and video digital content. DRM imposes certain responsibilities on the content owner and on the content consumer. The content owner must create the digital work, protect the digital work by encrypting it, and distribute the encrypted digital work. The consumer downloads the encrypted digital work to his/her platform and pays for a license to decrypt and use the encrypted digital work.

Among the ways in which DRM can be implemented on a remote platform such as a mobile telephone, a personal computer, a set-top box or an audio player, are the following:

1. Software protection only: a software module integrated in the operating system of the platform controls authentication and data decryption. The main drawback of this solution is the lack of a secured element to store the secret keys used for authentication and decryption and for performing the authentication and decryption. Another drawback of this solution is that the cryptographic computations are not done in a secure, encapsulated environment. A hacker can copy and duplicate the decrypted data simply by probing the platform bus.

2. Secure system: the entire DRM process is performed by one or more hardware-protected (co)processor(s). This solution provides a higher level of security.

FIG. 1 is a high-level partial schematic illustration of a DRM system that includes a server 48 for storing and dispensing encrypted digital audio or video data and a remote platform 10. In the specific embodiment of a DRM platform that is illustrated in FIG. 1, server 48 is located at a base station 46 of a cellular telephony network and remote platform 10 is a mobile telephone that includes a transceiver 12 and an antenna 14 for communicating with base station 46. The overall operation of mobile telephone 10 is controlled by a microprocessor-based controller 16 in conjunction with a hardware-protected cryptographic coprocessor 18. Controller 16 typically includes two microprocessors: one microprocessor for controlling transceiver 12 and the other microprocessor for controlling the other components of mobile telephone 10. Cryptographic coprocessor 18 is represented in FIG. 1 as a subscriber identity module (SIM) such as is used in mobile telephony systems under the GSM standard. Using transceiver 12 and antenna 14, controller 16 transmits to server 48 at base station 46 a request (including user identification and payment instructions) to download encrypted digital audio or video data. In response, server 48 transmits the encrypted digital audio data back to mobile telephone 10. Controller 16 uses antenna 14 and transceiver 12 to receive the encrypted digital data, and then stores the encrypted digital data in a non-volatile memory 22 that could be, for example, a magnetic hard disk, a flash memory or an EEPROM. With regard to form factor, non-volatile memory 22 could be an on-board chip, or alternatively a removable device such as a MMC card or a SD card. When the user of mobile telephone 10 wishes to play the data, controller 16 retrieves the encrypted digital data from memory 22. The encrypted digital data then are decrypted by SIM 18, and the decrypted digital data are sent to a player 20. For example, if the downloaded data are audio data, player 20 could be an MP3 player. Player 20 then transforms the decrypted digital audio data to analog signals, optionally amplifies the analog signals, and sends the analog signals to a speaker 24 that transforms the audio signals into audible sound.

Components 12, 16, 18, 20 and 22 typically are realized as separate integrated circuits that communicate with each other via one or more common buses 26.

It is commonly recognized that the most secure form of DRM relies on a public key infrastructure. Preferably, the authentication of remote platform 10 to the base station is effected using an asymmetrical algorithm such as RSA, and the encryption and decryption of the digital audio data is effected using a symmetrical algorithm such as DES. The DES encryption keys that remote platform 10 needs to decrypt the encrypted digital data are encrypted using the asymmetrical algorithm prior to being sent to remote platform 10 by the base station.

In the embodiment of remote platform 10 that is illustrated in FIG. 1, SIM 18 serves as the hardware-protected DRM coprocessor. SIM 18 authenticates remote platform 10 to the base station via controller 16 and transceiver 12 and decrypts the DES keys. Controller 16 uses the decrypted DES keys to decrypt the encrypted digital data stored in memory 22 and then sends the decrypted digital data to player 20. All the keys needed to implement the authentication of remote platform 10 and the cryptographic functionality of remote platform 10 are stored in SIM 18. The main drawback of this embodiment is that controller 16 sends the digital data to player 20 in clear format, so that a hacker could copy and duplicate the digital data simply by probing bus 26.

Two alternate embodiments of remote platform 10 are known, in which a separate cryptographic coprocessor such as SIM 18 is not used to implement any of the cryptographic functionality.

In the first alternate embodiment of remote platform 10, controller 16 is the hardware-protected DRM processor, and all the cryptographic functionality is handled by controller 16. Controller 16 authenticates remote platform 10 to the base station, decrypts the encrypted digital data stored in memory 22, and sends the decrypted digital data to player 20. All the keys needed to implement the cryptographic functionality are stored in controller 16. The main drawback of this alternate embodiment is the same as the main drawback of the embodiment of FIG. 1: controller 16 sends the digital data to player 20 in clear format, so that a hacker could copy and duplicate the digital audio data simply by probing bus 26.

In the second alternate embodiment of remote platform 10, the cryptographic functionality is distributed between controller 16 and player 20, so that both controller 16 and player 20 serve as hardware-protected DRM processors. Controller 16 authenticates remote platform 10 to the base station and sends the encrypted digital data to player 20. Player 20 decrypts the encrypted digital data. The keys needed for authentication are stored in controller 16. The keys needed for decryption are stored in player 20. The main drawback of this alternate embodiment is the extra expense of two components with cryptographic capabilities.

An additional drawback of the two alternative embodiments, as compared to the embodiment of FIG. 1, is that controller 16 and player 20 of FIG. 1 are pure logic integrated circuits. Controller 16 of the two alternative embodiments, and player 20 of the second alternative embodiment, must also include their own read/write non-volatile memories, so that the secret cryptographic keys can be replaced as necessary. Integrating a non-volatile memory in an otherwise pure logic integrated circuit may raise the cost of the integrated circuit substantially.

There is thus a widely recognized need for, and it would be highly advantageous to have, a hardware-protected DRM ASIC for remote platforms that would overcome the disadvantages of presently known systems as described above.

SUMMARY OF THE INVENTION

According to the present invention there is provided an integrated circuit including: (a) a processor for: (i) requesting encrypted digital data, and (ii) decrypting the encrypted digital data, thereby providing decrypted digital data; and (b) a player for transforming the decrypted digital data to analog signals.

According to the present invention there is provided a system for displaying digital data, including: (a) a server for storing the digital data in an encrypted form; and (b) a user platform including: (i) an integrated circuit that includes: (A) a processor for: (I) requesting the encrypted digital data from the server, and (II) decrypting the encrypted digital data, thereby providing decrypted digital data, and (B) a player for transforming the decrypted digital data to analog signals.

According to the present invention there is provided a method of requesting encrypted digital data from a server and then decrypting and displaying the encrypted digital data, including the steps of: (a) providing an integrated circuit that includes: (i) a processor operative to: (A) request the encrypted digital data from the server and (B) decrypt the encrypted digital data, thereby providing decrypted digital data, and (ii) a player operative to transform the decrypted digital data to analog signals; (b) requesting the encrypted digital data from the server, by the processor; (c) decrypting the encrypted digital data, by the processor, thereby providing the decrypted digital data; and (d) transforming the decrypted digital data to analog signals, by the player.

Essentially, the integrated circuit of the present invention is an ASIC that implements the cryptographic functionality of prior art controller 16 and SIM 18 but that outputs analog signals directly to speaker 24. The basic components of the integrated circuit of the present invention are a processor for requesting encrypted digital data from a server and for decrypting the encrypted digital data to provide decrypted digital data, and a player for transforming the decrypted digital data to analog signals. Correspondingly, the basic steps of the method of the present invention include the steps of providing the basic integrated circuit of the present invention, using the processor to request the encrypted digital data from the server, using the processor to decrypt the encrypted digital data, and using the player to transform the decrypted digital data to analog signals.

Preferably, "requesting" the encrypted digital data includes authenticating the integrated circuit to the server. Most preferably, the authentication is effected using an asymmetrical algorithm, for example a RSA algorithm or a ECC algorithm.

Preferably, the decrypting of the encrypted digital data is effected using a symmetrical algorithm, for example a DES algorithm or a Rijndael algorithm.

Preferably, the integrated circuit of the present invention is tamper-resistant. When an attempt to tamper with the integrated circuit is detected, the integrated circuit is reset.

Particular examples of the kinds of digital data for which the present invention is suitable include digital audio data and digital video data.

The interface via which the processor receives the encrypted digital data may be any suitable interface, for example an ISO7816 interface, a local bus interface, a MMCA interface, a SDA interface, a USB interface or a parallel interface.

The form factor of the integrated circuit of the present invention may be any suitable form factor, for example a SIM form factor, a TQFP form factor, a DIP form factor, a SOP form factor or a BGA form factor.

Preferably, the integrated circuit of the present invention includes only one processor. Nevertheless, the integrated circuit of the present invention may include, and usually does include, one or more coprocessors. A coprocessor is a state machine that is provided in addition to the processor for performing specialized tasks under the direction of the processor.

Preferably, the integrated circuit of the present invention includes a ROM for storing management code that is executed by the processor to operate the integrated circuit. Most preferably, the management code of the integrated circuit is stored only in the ROM, and not, for example, in a memory such as an EEPROM that can be erased and rewritten electronically.

The scope of the present invention also includes a device (also referred to herein as a "user platform", for receiving, decrypting and displaying encrypted digital data, that includes the integrated circuit of the present invention. Preferably, the device of the present invention also includes a transceiver for transmitting a request from the processor for the encrypted digital data and for receiving the encrypted digital data. Preferably, the device of the present invention also includes a display mechanism for displaying the analog signals. Note that the term "displaying", as used herein, means transforming the analog signals into corresponding physical sensations that can be perceived by a user of the device, so that speaker 24, that transforms incoming analog signals to audible sound, is an example of a "display mechanism" as understood herein, as is a video screen for transforming incoming analog signals to a visible video image.

Preferably, the device of the present invention includes a nonvolatile memory such as a flash memory for storing the encrypted data. Correspondingly, the method of the present invention preferably includes the step of storing the encrypted digital data in the nonvolatile memory.

The scope of the present invention also includes a DRM system that includes both the device of the present invention and a server, wherein the digital data are stored, that transmits the digital data to the device when a request accompanied by a valid authentication is received from the device by the server. Preferably, the server is configured to transmit substantially only the encrypted digital data, and the keys needed to decrypt the encrypted digital data, to the device.

Decrypting the encrypted digital data typically requires at least one cryptographic key. The method of the present invention preferably includes the steps of having the processor request the key(s) needed for decrypting from the server and then storing the key(s) in the nonvolatile memory. Most preferably, the key(s) is/are encrypted before being stored in the non-volatile memory.

Gressel et al., in published US patent application no. 2002/0070272, teach an integrated circuit for authenticating a remote user of a host system to the host system so that the user can download and run programs such as Java scripts from the host system. The problem addressed by Gressel et al. is that if the users use prior art smart cards of the type illustrated in FIG. 3 of Gressel et al. to authenticate themselves to the host system, a malicious system programmer could devise code to hack the smart cards from the host system. Therefore, the functionality of the integrated circuit of Gressel et al. is partitioned between two sections, a "security application module" that handles the cryptographic functionality and a "trusted application computing environment" for executing the programs received from the host system. The functionality is partitioned in a way that prevents hacking of the security application module from the host system. Each section has its own processor. In the embodiment illustrated in FIG. 9 of Gressel et al., each section also has its own digital-to-analog converter. The intended use of the embodiment of FIG. 9 of Gressel et al. is for combining unenhanced video data from the host with encrypted audio data and encrypted video enhancement data purchased separately by the user, and then displaying the combined data.

In part, the present invention is based on the insight that there are environments in which the high degree of security taught by Gressel et al. is not needed. Generally, the primary reason for downloading code to a smart card or to a SIM is to upgrade the software of the smart card or the SIM. In the context of cellular telephony, for example, the operator of a cellular telephone network may choose to secure the subscriber's SIMs 18 against hacking by never downloading executable code from server 48, but instead upgrading the SIMs 18 by some other means, for example issuing new SIMs to the subscribers. Alternatively, the operator may use some other method, such as third-party byte code certification, to check all code for malicious tampering before downloading the code from server 48. Under such circumstances, a prior art smart card such as the smart card of FIG. 3 of Gressel et al., or the equivalent SIM 18, is perfectly secure. Including a player with a digital-to-analog converter in SIM 18 turns SIM 18 into an integrated circuit, for decrypting and displaying encrypted digital data, that is relatively immune both to physical probing by a local hacker and to remote hacking from server 48.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an ASIC for implementing digital rights management and of a DRM system that includes a user platform based on that ASIC. Specifically, the present invention can be used to control distribution of proprietary digital data to remote platforms.

The principles and operation of an ASIC according to the present invention may be better understood with reference to the drawings and the accompanying description.

Figure 1:
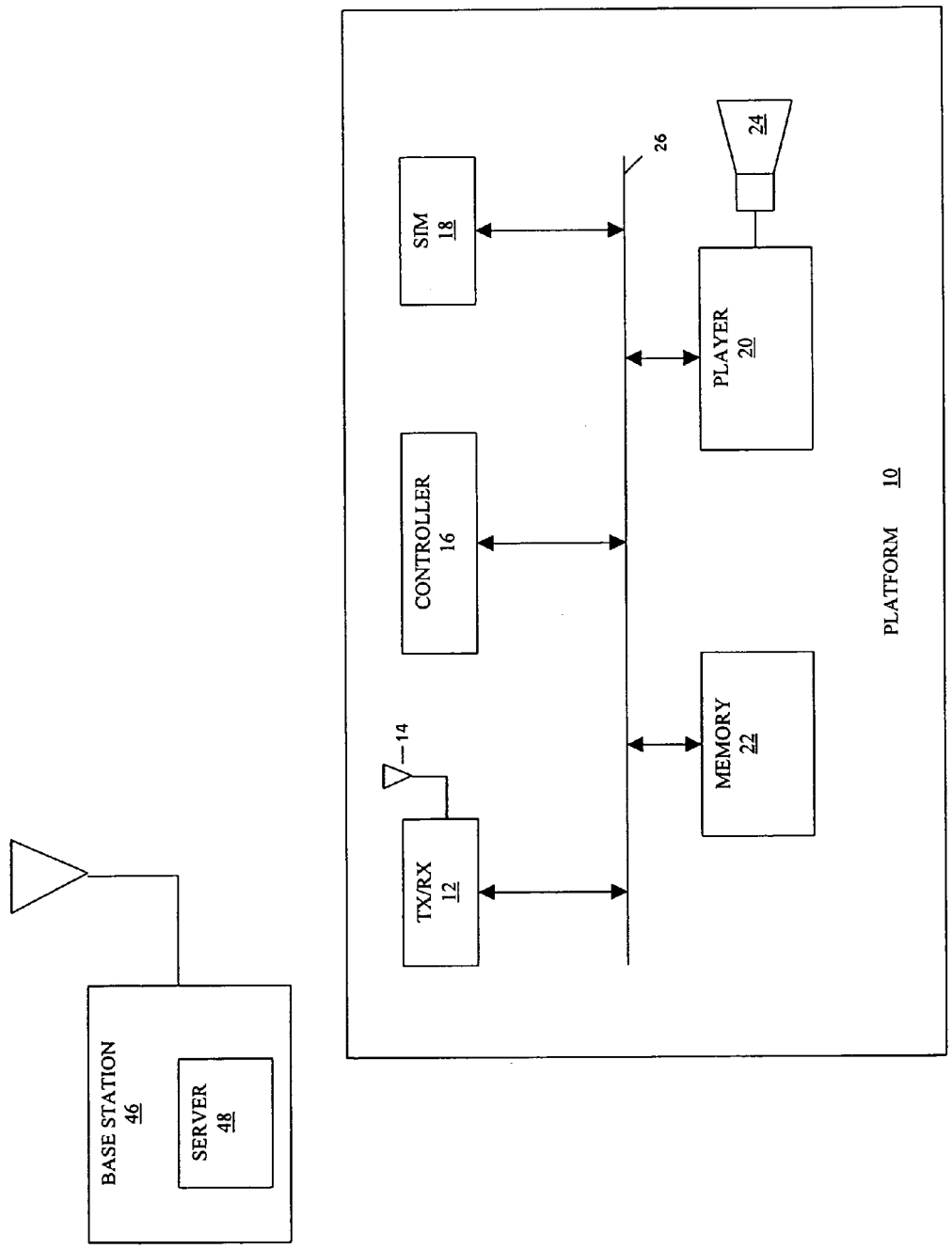
FIG. 1 is a high-level schematic block diagram of a prior art DRM system.
Figure 2:
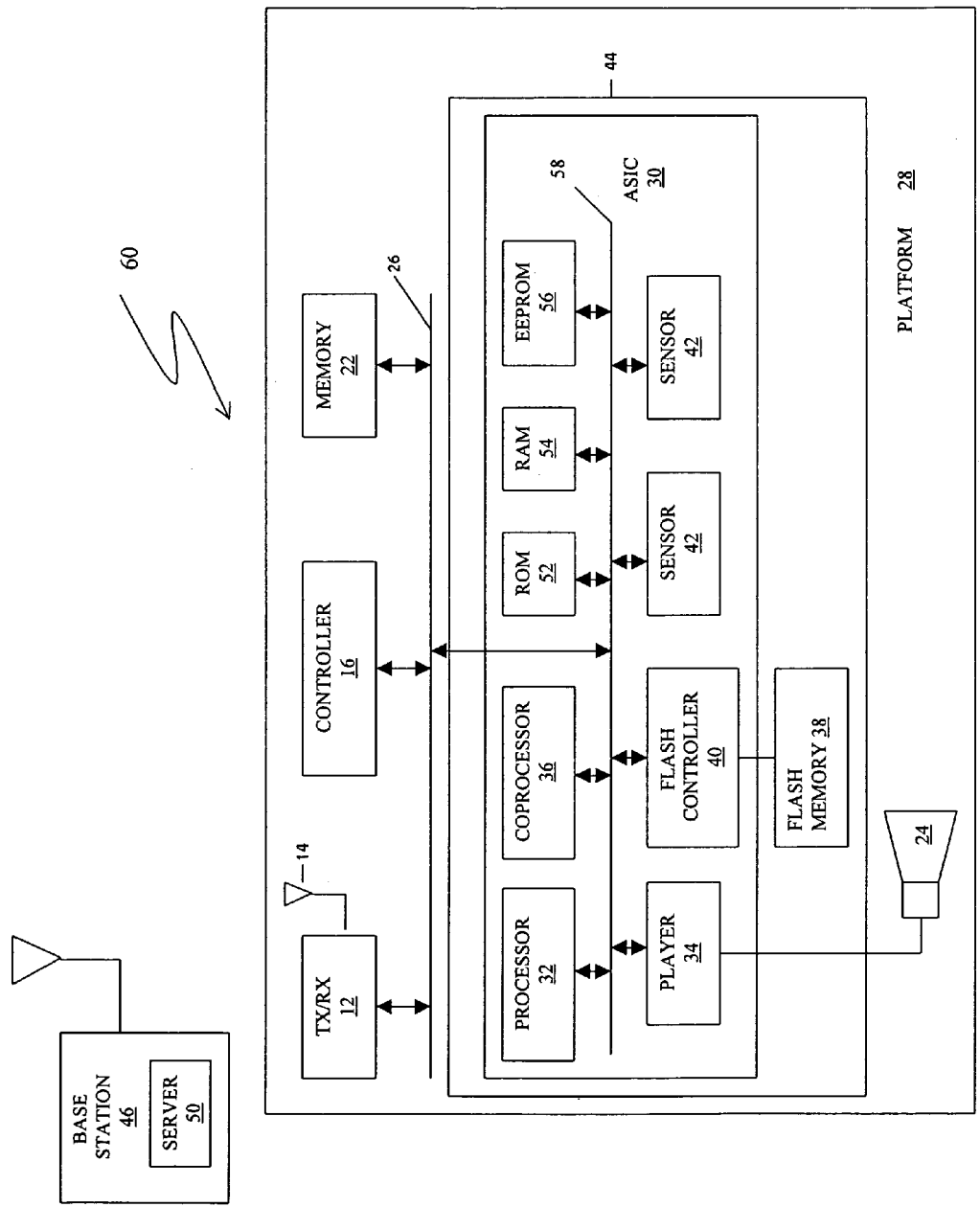
FIG. 2 is a high-level schematic block diagram of a DRM system of the present invention.

Returning now to the drawings, FIG. 2 is a high-level partial schematic illustration of a system 60 of the present invention. System 60 includes a server 50, substituted for server 48 in base station 46, and a remote platform 28 that, like remote platform 10, is configured as a mobile telephone, in order to communicate with server 50 in base station 46. Remote platform 28 is similar to remote platform 10, but with an ASIC 30 of the present invention, along with a flash memory 38, substituted for SIM 18 and player 20. The other components of remote platform 28 are substantially identical to the corresponding components of remote platform 10, and so are designated in FIG. 2 by the same reference numerals as in FIG. 1. All of the cryptographic functionality of remote platform 28 is performed by ASIC 30.

ASIC 30 includes the following illustrated components:
A processor 32 for overall management of ASIC 30.
A dedicated cryptographic coprocessor 36 for cryptographic functionality.
An ASIC ROM 52 for storing the management code of ASIC 30.
An ASIC RAM 54 that is used by processor 32 for temporary storage.
A flash memory controller 40 for controlling flash memory 38.
A player 34.
An ASIC EEPROM 56 for storing the cryptographic keys.
Several sensors 42 for detecting attempts to physically tamper with ASIC 30.
An ASIC bus 58 via which the other components of ASIC 30 communicate with each other.

ASIC 30 also includes several components, such as a power management module, a random number generator, an interrupt controller and an internal clock, that, for illustrational clarity, are not included in FIG. 2 All the components of ASIC 30 are fabricated together on a common substrate as a single integrated circuit.

ASIC 30 and flash memory 38, which is itself an ASIC, are packaged together in a common package 44. Flash memory 38 is used, under the control of flash memory controller 40, to store and retrieve encrypted digital audio data. As requested by a user of remote platform 28, the encrypted digital audio data are decrypted and sent to player 34.

Player 34 differs from player 20 in that unlike player 20, player 34 does no digital processing of its own. Player 34 essentially is just a digital-to-analog converter that transforms the decrypted digital data to analog signals that are transformed to user-perceptible sensations by display mechanism 24. For example, if the digital data are audio data, then display mechanism 24 is a speaker that transforms the analog signals to audible sound.

For illustrational simplicity, ASIC 30 is shown as including one cryptographic coprocessor 34. Typically, ASIC 30 includes several cryptographic coprocessors 34, also called "cores", each for implementing a respective cryptographic algorithm. For example, one embodiment of ASIC 30 includes four cores 34: an AES core, a DES core, a SHA-1 core and a RSA/ECC core.

Also for illustrational simplicity, ASIC 30 is shown as including two sensors 42. Typically, ASIC 30 includes a variety of sensors, in its outer layers. These sensors are selected from among voltage sensors, probe sensors, wire sensors, piezoelectric sensors, motion sensors, ultrasonic sensors, microwave sensors, infrared sensors, accelerations sensors, radiation flux sensors, radiation dosage sensors and temperature sensors, as described by S. H. Weingart in "Physical security devices for computer subsystems: a survey of attacks and defenses", *Lecture Notes in Computer Science* vol. 1965 pp. 302–317 (2001), which publication is incorporated by reference for all purposes as if fully set forth herein. Detection by one of sensors 42 of an attempt to tamper with ASIC 30 triggers a reset of ASIC 30 to prevent a hacker from reading the cryptographic keys off of bus 58.

In this particular preferred embodiment of the present invention, the management code of ASIC 30 is fixed in ROM 52. Upgrading the management code of ASIC 30 is effected by physically replacing the entire ASIC 30 by a new ASIC 30 with an upgraded ROM 52. It therefore being unnecessary to download management code from server 50 to ASIC 30, server 50 is configured to send to remote platform 28 essentially only encrypted digital data and keys for decrypting the encrypted digital data.

The operation of remote platform 28 is as follows. Using one or more of the authentication keys stored in EEPROM 56, processor 32 authenticates remote platform 28 to server 50 at base station 46, via controller 16 and transceiver 12, as part of a request for the transmission of encrypted digital audio or video data. The authentication is done using an asymmetrical algorithm such as RSA or ECC. Server 50 sends the requested encrypted digital data from base station 46 to remote platform 28. Processor 32 receives the requested encrypted digital data via transceiver 12 and controller 16, and uses flash controller 40 to store the received encrypted digital data in flash memory 38. Server 50 also sends one or more decryption keys from base station 46 to remote platform 28. Processor 32 receives the decryption key(s) via transceiver 12 and controller 16, and then stores the decryption keys in EEPROM 56. (Alternatively, coprocessor 36 encrypts the decryption key(s) and uses flash controller 40 to store the encrypted decryption key(s) in flash memory 38.) When a user wishes to play the data, the user enters the appropriate command at a user command interface (not shown) of remote platform 28, instructing processor 32, via controller 16, to retrieve and decrypt the encrypted digital data. Processor 32 then uses flash controller 40 to retrieve the encrypted digital data from flash memory 22 and then uses coprocessor 36 and the appropriate decryption keys from EEPROM 56 to decrypt the encrypted digital data. The decryption is done using a symmetrical algorithm such as DES or Rijndael. Processor 32 then decodes the resulting decrypted digital data and sends the decoded data to player 34, which transforms the decoded data to analog signals and sends the analog signals to display mechanism 24. An alternative embodiment of ASIC 30 lacks EEPROM 56. Instead, a unique key, for example a DES key, that remains the same for the lifetime of ASIC 30, is stored in ROM 52. This key is used by processor 32 and coprocessor 36 to encrypt the other keys, which then are stored in encrypted form in flash memory 38 and are retrieved from flash memory 38 and decrypted by processor 32 and coprocessor 36 as needed.

That ASIC 30 is described herein as a replacement for SIM 18 should not be interpreted as requiring that ASIC 30 have a SIM form factor. ASIC 30 may have any suitable form factor, for example a TQFP form factor, a DIP form factor, a SOP form factor or a BGA form factor. Similarly, the interface between ASIC 30 and bus 26 need not be the ISO7816 interface that is standard for SIMs, but may be any suitable interface, for example a local bus interface, a MMCA interface, a SDA interface, a USB interface or a parallel interface.

That the digital input to ASIC 30 is encrypted, whereas the output from ASIC 30 is analog rather than digital, inhibits unlicensed copying of the data. Although the analog signals emerging from ASIC 30 are in clear format, their quality is sufficiently low, relative to the input digital data, to provide a disincentive to unlicensed copying.

Furthermore, unlike the alternate prior art embodiments discussed above, there are no significant incremental costs associated with the substitution of ASIC 30 for SIM 18 and player 20. Remote platform 28 has only one integrated circuit with cryptographic capabilities, unlike the second alternate prior art embodiment which requires two integrated circuits with cryptographic capabilities. Furthermore, although the fabrication of ASIC 30 requires the integration of logic circuits and memory circuits in the same integrated circuit, so does the fabrication of SIM 18.

While the invention has been described with respect to a limited number of embodiments, it will be appreciated that many variations, modifications and other applications of the invention may be made.

What is claimed is:

1. A device for digital rights management, comprising:
   (a) an integrated circuit including:
      (i) a processor for:
         (A) requesting encrypted digital data, and
         (B) decrypting said encrypted digital data, thereby providing decrypted digital data; and
      (ii) a player for transforming said decrypted digital data to analog signals; and
   (b) a flash memory for storing said encrypted digital data.

2. The device of claim 1, wherein said encrypted digital data are requested from a server and wherein said requesting of said encrypted digital data includes authenticating said integrated circuit to said server.

3. The device of claim 1, wherein said integrated circuit is tamper-resistant.

4. The device of claim 1, wherein said encrypted digital data are audio data.

5. The device of claim 1, wherein said encrypted digital data are video data.

6. The device of claim 1, wherein said processor includes an interface for receiving said encrypted digital data.

7. The device of claim 6, wherein said interface is selected from the group consisting of an ISO7816 interface, a local bus interface, a MMCA interface, a SDA interface, a USB interface and a parallel interface.

8. The device of claim 1, wherein said integrated circuit has a form factor selected from the group consisting of a SIM form factor, a TQFP form factor, a DIP form factor, a SOP form factor and a BGA form factor.

9. The device of claim 1, further comprising:
   (c) a transceiver for transmitting a request for said encrypted digital data from said processor and for receiving said encrypted digital data.

10. The device of claim 1, further comprising:
    (c) a display mechanism for displaying said analog signals.

11. The device of claim 1, wherein said integrated circuit includes a single said processor.

12. The device of claim 1, wherein said integrated circuit further includes:
    (iii) a ROM for storing management code that is executed by said processor to operate said integrated circuit.

13. The device of claim 12, wherein said management code is stored only in said ROM.

14. A system for digital rights management, comprising:
(a) a server for storing encrypted digital data; and
(b) a user platform including:
(i) an integrated circuit that includes:
(A) a processor for:
(I) requesting said encrypted digital data from said server, and
(II) decrypting said encrypted digital data, thereby providing decrypted digital data, and
(B) a player for transforming said decrypted digital data to analog signals, and
(ii) a flash memory for storing said encrypted digital data.

15. The system of claim 14, wherein said requesting of said encrypted digital data from said server includes authenticating said integrated circuit to said server.

16. The system of claim 14, wherein said integrated circuit is tamper resistant.

17. The system of claim 14, wherein said user platform further includes:
(ii) a transceiver for transmitting to said server a request for said encrypted digital data and for receiving said encrypted digital data.

18. The system of claim 14, wherein said user platform further includes:
(ii) a display mechanism for displaying said analog signals.

19. The system of claim 14, wherein said integrated circuit includes a single said processor.

20. The system of claim 14, wherein said server is configured to transmit substantially only said encrypted digital data to said user platform.

21. The system of claim 14, wherein said integrated circuit further includes:
(C) a ROM for storing management code that is executed by said processor to operate said integrated circuit.

22. The system of claim 21, wherein said management code is stored only in said ROM.

23. A digital rights management method comprising the steps of:
(a) storing encrypted digital data at a server;
(b) providing an integrated circuit that includes:
(i) a processor operative to:
(A) request said encrypted digital data from the server and
(B) decrypt said encrypted digital data, thereby providing decrypted digital data, and
(ii) a player operative to transform said decrypted digital data to analog signals;
(c) requesting said encrypted digital data from the server, by said processor;
(d) decrypting said encrypted digital data, by said processor, thereby providing said decrypted digital data;
(e) transforming said decrypted digital data to analog signals, by said player; and
(f) storing said encrypted digital data in a flash memory.

24. The method of claim 23, wherein said requesting includes authenticating said integrated circuit to the server.

25. The method of claim 24, wherein said authenticating is effected using an asymmetrical algorithm.

26. The method of claim 25, wherein said asymmetrical algorithm is a RSA algorithm.

27. The method of claim 25, wherein said asymmetrical algorithm is a ECC algorithm.

28. The method of claim 23, wherein said decrypting is effected using a symmetrical algorithm.

29. The method of claim 28, wherein said symmetrical algorithm is a DES algorithm.

30. The method of claim 28, wherein said symmetrical algorithm is a Rijndael algorithm.

31. The method of claim 23, wherein said decrypting is effected using at least one key, and wherein the method further comprises the step of:
(g) requesting said at least one key from the server, by said processor.

32. The method of claim 31, wherein the method further comprises the step of:
(h) storing said at least one key in a nonvolatile memory.

33. The method of claim 32, further comprising the step of:
(i) encrypting said at least one key, prior to said storing of said at least one key in said nonvolatile memory.

34. The method of claim 31, further comprising the step of:
(h) configuring the server to send substantially only the encrypted digital data and said at least one key to said integrated circuit.

35. The method of claim 23, further comprising the step of:
(g) upon detecting an attempt to tamper with said integrated circuit: resetting said integrated circuit.

36. The method of claim 23, further comprising the step of:
(g) configuring the server to send substantially only the encrypted digital data to said integrated circuit.

37. The system of claim 14, wherein said digital data are audio data.

38. The system of claim 14, wherein said digital data are video data.

39. The method of claim 23, wherein said encrypted digital data are audio data.

40. The method of claim 23, wherein said encrypted digital data are video data.

41. A device for digital rights management, comprising:
(a) a memory; and
(b) an integrated circuit, separate from said memory, and including:
(i) a processor for:
(A) requesting encrypted digital data from a server,
(B) receiving said requested encrypted digital data,
(C) storing said requested encrypted digital data in said memory, and
(D) decrypting said requested encrypted digital data, thereby providing decrypted digital data, and
(ii) a player for transforming said decrypted digital data to analog signals.

42. A system for digital rights management, comprising:
(a) a server for storing encrypted digital data; and
(b) a user platform including:
(i) a memory, and
(ii) an integrated circuit, separate from said memory, and including:
(A) a processor for:
(I) requesting said encrypted digital data from the server,
(II) receiving said requested encrypted digital data,
(III) storing said requested encrypted digital data in said memory, and
(IV) decrypting said requested encrypted digital data, thereby providing decrypted digital data, and (B) a player for transforming said decrypted digital data to analog signals.

43. A device for digital rights management, comprising:
(a) a nonvolatile memory; and
(b) an integrated circuit, separate from said nonvolatile memory, and including:
  (i) a processor for:
    (A) requesting encrypted digital data and at least one key from a server,
    (B) storing said at least one key in said nonvolatile memory, and
    (C) decrypting said encrypted digital data, using said at least one key, thereby providing decrypted digital data, and
  (ii) a player for transforming said decrypted digital data into analog signals.

44. A system for digital rights management, comprising:
(a) a server for storing encrypted digital data and at least one key; and
(b) a user platform including:
  (i) a nonvolatile memory, and
  (ii) an integrated circuit, separate from said nonvolatile memory, and including:
    (A) a processor for:
      (I) requesting said encrypted digital data and said at least one key from said server,
      (II) storing said at least one key in said nonvolatile memory, and
      (III) decrypting said encrypted digital data, using said at least one key, thereby providing decrypted digital data, and
      (B) a player for transforming said decrypted digital data to analog signals.

45. An integrated circuit for digital rights management, comprising:
(a) a processor for:
  (i) requesting encrypted digital data from a server,
  (ii) receiving said encrypted digital data from said server, and
  (iii) decrypting said encrypted digital data only after all said encrypted digital data have been received from said server; and
(b) a player for transforming said decrypted digital data to analog signals.

46. A system for digital rights management, comprising:
(a) a server for storing encrypted digital data; and
(b) a user platform, for playing said encrypted digital data, the user platform including an integrated circuit that includes:
  (i) a processor for:
    (A) requesting said encrypted digital data from said server,
    (B) receiving said encrypted digital data from said server, and
    (C) decrypting said encrypted digital data only after all said encrypted digital data have been received from said server, and
  (ii) a player for transforming said decrypted digital data to analog signals.

* * * * *